United States Patent [19]

Kimball, deceased

[11] Patent Number: 5,218,063
[45] Date of Patent: Jun. 8, 1993

[54] EPOXY ADHESIVES AND METHODS OF USING CURED COMPOSITIONS THEREFROM

[75] Inventor: Edward A. Kimball, deceased, late of Westbrook, Me.; by Edward A. Kimball, legal representative

[73] Assignee: W. R. Grace & Co.-Conn., New York, N.Y.

[21] Appl. No.: 721,738

[22] Filed: Jun. 26, 1991

[51] Int. Cl.$^5$ .......................................... C08F 283/00
[52] U.S. Cl. .................................. 525/531; 525/532; 525/533; 525/931
[58] Field of Search ................ 525/531, 931, 532, 533

[56] References Cited

U.S. PATENT DOCUMENTS

| | | | |
|---|---|---|---|
| 4,121,015 | 10/1978 | McPherson | 428/418 |
| 4,159,976 | 7/1979 | Moran, Jr. | 525/113 |
| 4,423,170 | 12/1983 | Waddill | 528/407 |
| 4,485,229 | 11/1984 | Waddill et al. | 525/504 |
| 4,581,422 | 4/1986 | Speranza et al. | 525/504 |
| 4,866,108 | 9/1989 | Vachon et al. | 523/466 |
| 4,940,770 | 7/1990 | Speranza et al. | 528/111 |
| 5,071,914 | 12/1991 | Zimmel et al. | 525/117 |

OTHER PUBLICATIONS

"Kraton Rubber Modified Epoxy Blends", L. A. Pottick, 34th Int'l SAMPE Symposium May 8-11, 1989, pp. 2243-2254.

Journal of Applied Polymer Science, vol. 26, 1981, "Rubber-Modified Epoxies. II. Morphology and Mechanical Properties"—L. T. Manzione et al. pp. 907-919.

Journal of Applied Polymer Science, vol. 40, Nos. 1 & 2, Jul. 5 & 20, 1990—"Epoxy-Amine Oligomer Production"—T. R. Cuadrado et al. pp. 867-890.

Primary Examiner—John C. Bleutge
Assistant Examiner—Randy Gulakowski
Attorney, Agent, or Firm—Valerie E. Looper

[57] ABSTRACT

An epoxy composition suitable for adhesives, coatings and sealants is prepared from (a) at least one reaction product of an epoxy and amine-capped oligomer, (b) an epoxy adduct of dimer acid, (c) dicyandiamide and (d) a catalyst which yields a dimethyl amine radical upon being heated. When the epoxy composition is cured, it exhibits two glass transition temperatures and good adhesion properties at and below room temperature. The epoxy is particularly suitable for adhesives used in the manufacturing of automobiles.

15 Claims, 6 Drawing Sheets

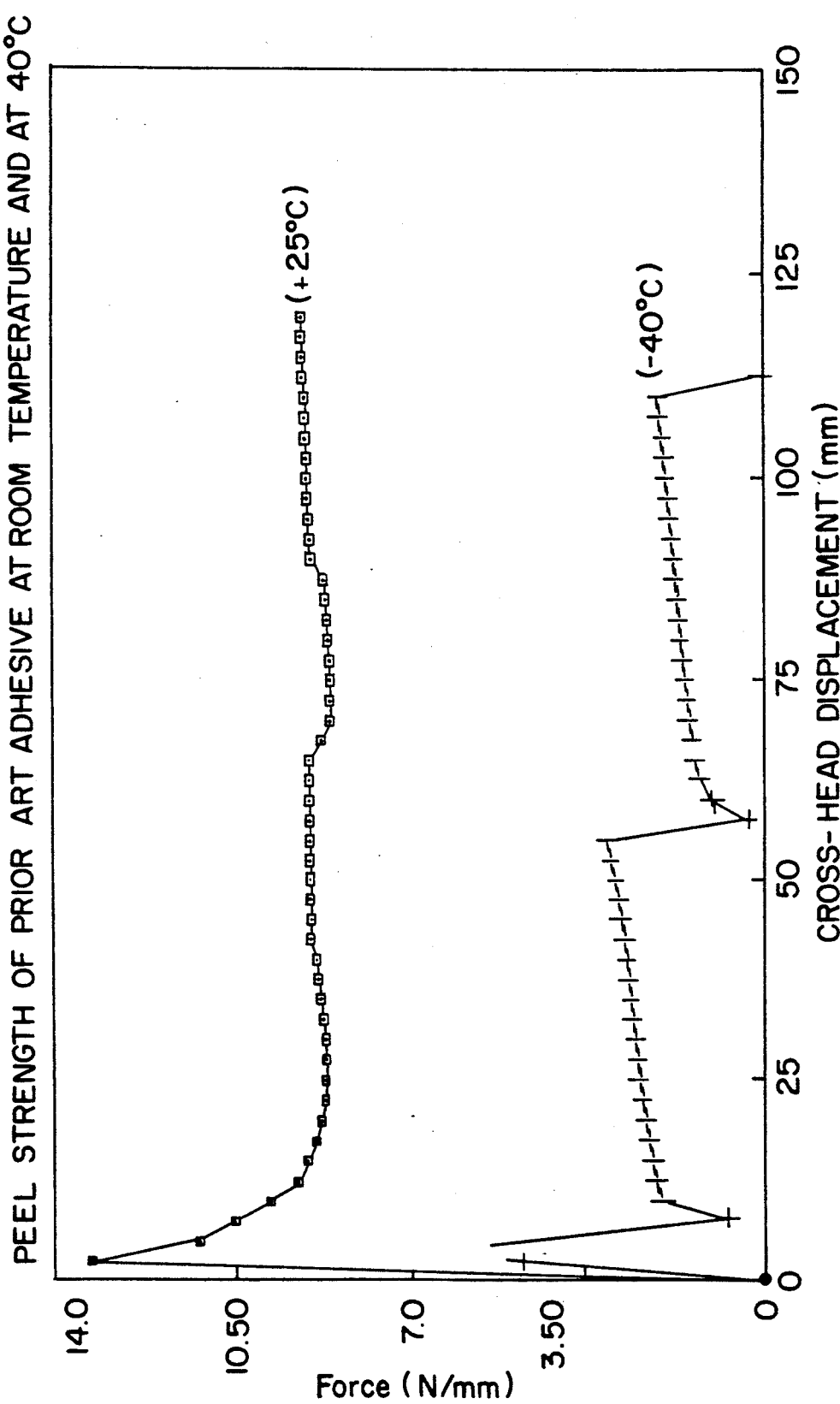

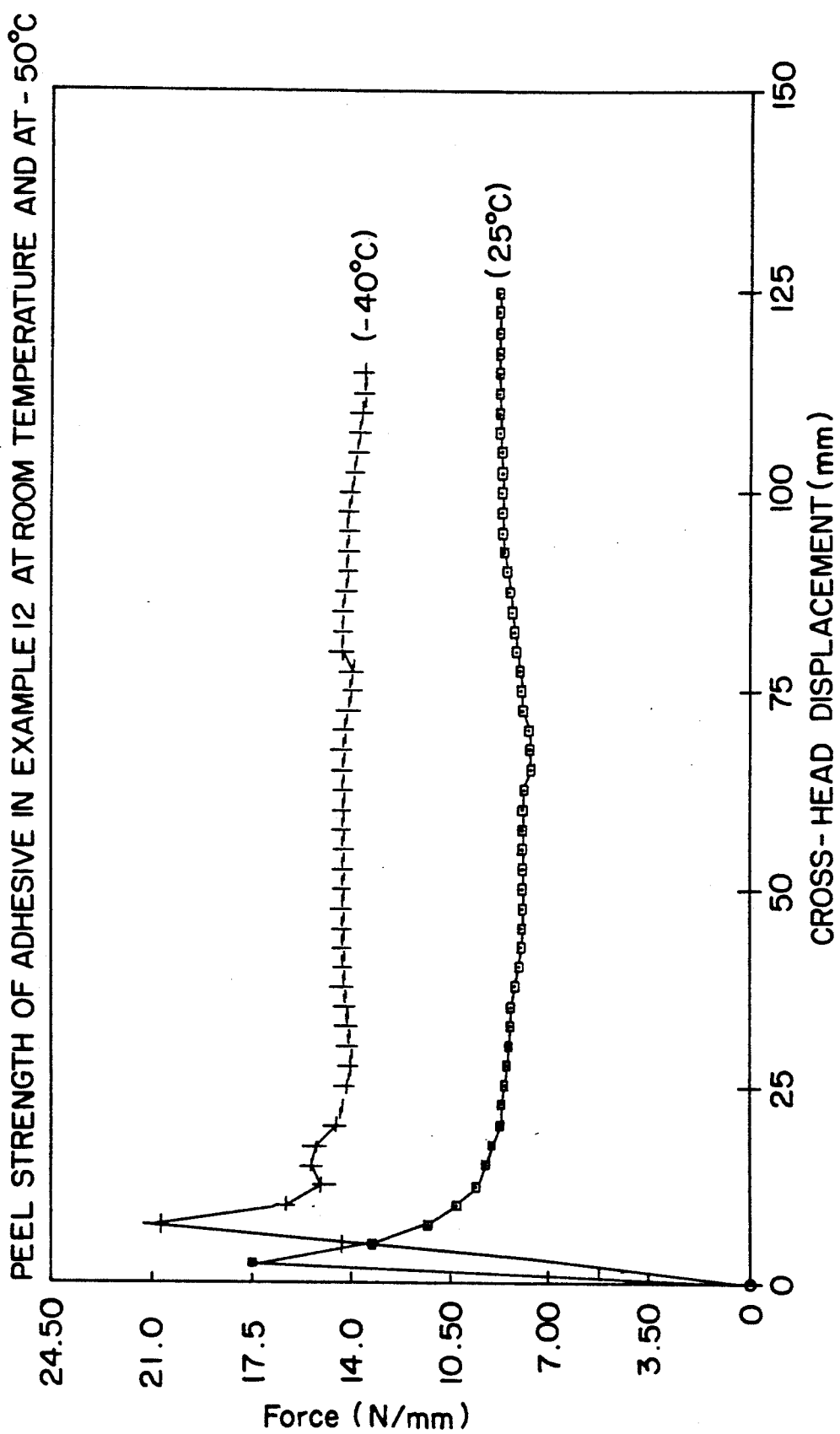

EPOXY ADHESIVES AND METHODS OF USING CURED COMPOSITIONS THEREFROM

FIELD OF THE INVENTION

The invention relates generally to the field of epoxy compositions and more specifically epoxy adhesives, sealants and coatings, especially those used in the automobile industry.

BACKGROUND

Epoxy compositions have long been known as compositions possessing an excellent balance of properties such as good adhesion, i.e. shear strength, low shrinkage upon cure, dimensional stability, hardness, and corrosion and solvent resistance. See Pottick, L. A., "Kraton® Rubber Modified Epoxy Blends," 34th Int. SAMPE Sym. May 8-11, pp. 2243-2254 (1989). However, when cured, epoxy alone tends to be brittle and exhibits low or no peel strength at room temperature and especially at colder temperatures. As a result, there have been attempts to modify epoxy compositions in order to counteract the epoxy's brittleness, thereby enhancing the peel strength of the compositions. Such strengthened compositions are especially desirable in applications in which the compositions will be exposed to a wide range of temperatures.

Past attempts to modify epoxies involved reacting them with copolymers of butadiene, acrylonitrile or other "rubber"-based compositions. See Pottick, supra; and *Journal of Applied Polymer Science*, Vol. 26, pp. 907-919 (1981). By reacting an epoxy with those compounds and then processing the modified composition to induce in situ phase separation, "rubber rich" domains within the epoxy composition are created. Those domains improve the toughness of the cured epoxy matrix once it is formed. However, while such modified epoxy compositions are tougher and less brittle at room temperature, improvements at lower temperatures prove to be, at best, marginal. Further, using the above-mentioned rubber-based material incurs processing problems due to an increase in viscosity of the adhesive mixture. For instance, polybutadiene-modified epoxies are difficult to process because of the limited solubility of polybutadiene in epoxy resins. As a result, the amount of polybutadiene that can be added is limited to the amount of polybutadiene which is soluble in the epoxy at room temperature. In many instances, the resulting compositions lack the amount of "rubber rich" domains necessary to toughen the composition especially at low temperatures. Polyacrylonitrile-butadiene copolymers compositions can be used as a substitute for polybutadienes. However, the epoxy compositions resulting therefrom are even less effective at lower temperatures.

SUMMARY OF THE INVENTION

It is an object of this invention to prepare a novel epoxy composition which has optimum adhesion properties not only at room temperature, but also at lower temperatures, the novel composition comprising
  (a) at least one reaction product of epoxy and amine-capped oligomer;
  (b) epoxy adduct of dimer acid; and
  (c) a catalyst system which is present in an amount sufficient to cause homopolymerization of epoxy;
wherein the novel composition is capable of having two sufficiently distinct glass transition temperatures when said composition is cured.

It is also an object of the invention to avoid the problems associated in preparing polybutadiene rubber-based epoxy compositions.

It is a further object of the invention to provide a method of adhering, coating, or sealing using a cured composition having two sufficiently distinct glass transition temperatures, wherein said method comprises:
  (1) applying onto a surface an epoxy composition comprising
    (a) at least one reaction product of epoxy and amine-capped oligomer;
    (b) epoxy adduct of a dimer acid; and
    (c) a catalyst system which is present in an amount sufficient to cause homopolymerization of epoxy;
  (2) heating said composition in such a manner to induce phase separation within the composition; and
  (3) completing the cure of the composition.

It is also an object of the invention to provide a novel adhesive and method of adhering automobile parts.

These and other objects will be readily apparent from the detailed description below.

BRIEF DESCRIPTION OF THE FIGURES

FIG. 5 is a curve measuring the amount of peel force (Newtons per millimeter) applied to a bond prepared from a prior art composition versus the crosshead displacement (millimeters) of the peel test machine as tension is applied to the bond.

FIG. 6 is a curve measuring the same parameters illustrated in FIG. 5 except the bond was prepared from a composition of the invention.

DETAILED DESCRIPTION

Figure 1:
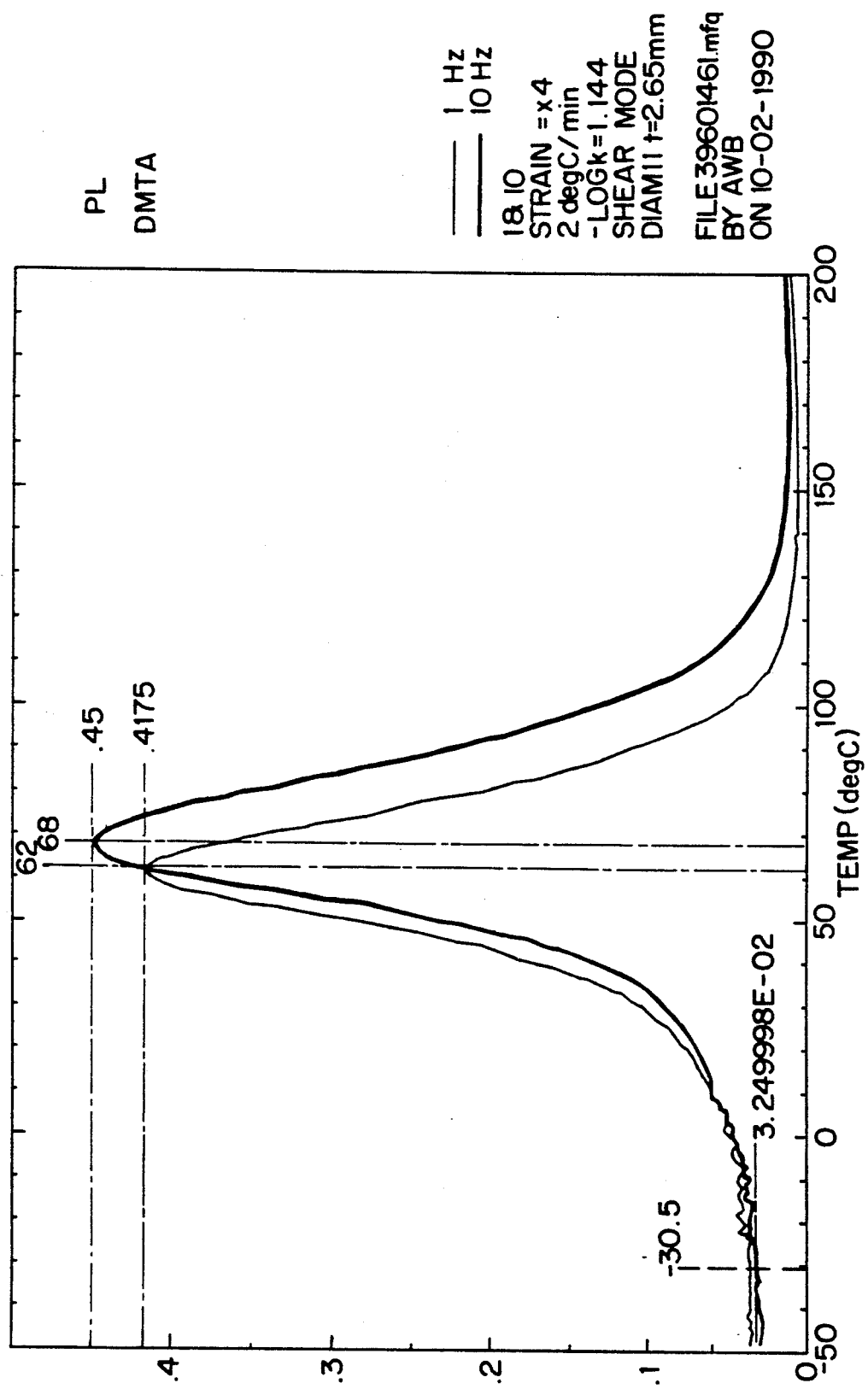
FIG. 1 is a dynamical mechanical thermal analysis (DMTA) measurement indicating the glass transition temperature of an epoxy composition having essentially one glass transition temperature.

As will be evident from the discussion below, the amine-capped oligomers indicated above are used as a substitute for rubber-based oligomers used in the prior art. Epoxy compositions prepared with (a) and (b)-(c) have suitable adhesion properties over a range of temperatures, including low temperatures. As further illustrated herein, the amine-capped oligomers, especially the polyether oligomers, are compatible with and easily reacted with epoxies. Moreover, when the epoxy composition of this invention is cured, a product having two sufficiently distinct glass transition temperatures results. While the effects of the two glass transition temperatures are discussed in more detail below, generally it has been discovered that cured products prepared according to this invention show good adhesion properties and toughness at temperatures lower than those shown for past epoxy compositions.

Reaction product (a) is prepared under well known epoxy/amine reaction conditions. See *Journal of Applied Polymer Science*, Vol. 40, pp. 867-890 (1990). For instance when using bisphenol A-based epoxies and amine-capped polyethers, the reaction can be conducted in the range of 25° C. to 100° C. for about 20 to 60 hours.

Suitable epoxies for preparing reaction product (a) include those based on bisphenol A. A preferred epoxy has the following formula I:

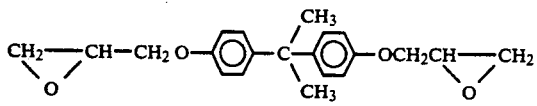

This epoxially is commercially available as EPON ® 828 epoxy from Shell or DER ® 331 epoxy from Dow. Other diglycidyl ethers of bisphenol A and F, as well as novolak epoxy resins, are also suitable.

Amine-capped oligomers suitable for preparing (a) include amine-capped polyethers. Preferable polyethers are polypropyleneglycol-based and have a weight average molecular weight of 2500 or greater, or are mixtures of polypropyleneglycol wherein the mixture has a weight average molecular weight of 2500 or greater.

Specific examples of amine-capped polyethers include those having formulas II and III below:

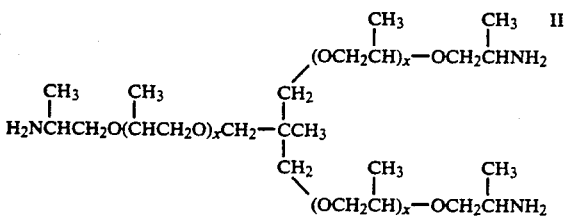

The amine-capped polyethers illustrated above are commercially available, respectively, as JEFFAMINE ® T-3000 and

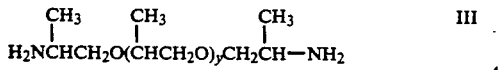

D-4000 from Texaco. Other commercially available polyether amines include other amines from the JEFFAMINE ® series.

While reaction product (a) can be prepared from just one epoxy and one amine-capped oligomer, it is possible to use a mixture of different epoxy-amine oligomer reaction products to obtain the most effective adhesion properties. When mixing reaction products prepared from two different amine-capped oligomers, it is preferable that the combined weight average molecular weight of the polyethers used to prepare the oligomers coincide with those weights discussed earlier, i.e. 2500 or greater.

It is preferable that the amount of (a) in the composition be no more than 70% by weight of the total resin in the composition. Compositions containing more than 70% by weight tend to exhibit interfacial bond failure between the adhesive and the substrate from which the bond is made.

Suitable epoxies for (b) include the epoxy adducts of dimer acids. Epoxies suitable for the preparation of such adducts are bisphenol A-based epoxies Suitable dimer acids include dimerized oleic, and linoleic acids, as well as mixtures containing dibasic, tribasic and monobasic acids. A preferred epoxy (b) is that having the following formula IV:

Y—X—Y wherein X is

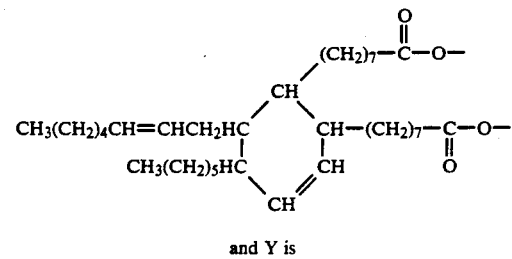

and Y is

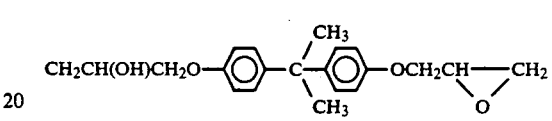

The epoxy identified above is commercially available as EPON ® 872 epoxy from Shell. A preferable amount of (b) would be at least 30% by weight of the total resins in the composition. At least 30% of (b) is preferable for the reasons discussed above in regards to the amount of (a) used.

As indicated above, (c) is a catalyst system which is present in a sufficient amount to cause homopolymerization of epoxy. Any epoxy which is present prior to the gelling of the composition during curing is subject to being part of the homopolymerization reaction. This includes not only epoxy (b), but also any additional epoxies which are added to the final composition formulation, as well as any unreacted epoxy present in (a). As will be discussed later below, it is believed that these homopolymerization products are partly responsible for the two glass transition temperatures which the compositions according to this invention exhibit when they are cured. As will also be discussed later below, cured compositions having those two glass transition temperatures exhibit good adhesion properties over a fairly wide range of temperatures.

One example of a catalyst system suitable for (c) is an imidazole or a blocked imidazole. Suitable commercial imidazoles include IMICURE ® EMI-24 imidazoles from Pacific Anchor Chemical Corporation. Suitable commercial blocked imidazoles are the CUREZOLE ® imidazole series from Shikoku Chemicals Corporation. Another suitable example of a blocked imidazole would be 2MZ-Azine, an imidazole from Shikoku Chemicals.

Another example of (c) comprises a combination of well known phenyl urea accelerators and dicyandiamide epoxy curing agents. It is believed that the combination of accelerator and catalyst lead to the formation of cyclic adducts of epoxy through the catalyzed and accelerated reaction of the cyandiamide's nitrile group and the linear products of epoxy. The cyclic adducts lead to the homopolymerization of epoxy. The accelerators can be further characterized as those ureas which yield a dimethyl amine radical when heated. A preferred example thereof is a FICURE ® accelerator, i.e. a phenyl dimethyl urea, from Omicron Chemical Co. However, other accelerators such as NOURON ® (phenyl dimethyl urea) and the Diuron ® and MONURON ® (chlorophenyl dimethyl ureas accelerators, would also be suitable. Also suitable are those accelerators available in the DYHARD® UR phenyl urea series, e.g. DYHARD UR-500 phenyl urea, from SKW Chemicals. Suitable amounts of accelerator would be in the range of 0.3% to 3% by weight of (a) and (b), depending on the amount of dicyandiamide used.

When using phenyl urea accelerators, the amount of phenyl urea sufficient to cause homopolymerization of epoxy, and subsequent phase separation, also depends on the amount and molecular weight of (a). For instance, when polypropylene glycol-based amine oligomers which have molecular weights of about 4000 are used to prepare (a), the minimum amount of accelerator required is about 0.3% by weight. On the other hand, if such amine oligomers have lower molecular weights, larger amounts of phenyl urea will be required. It appears that the relative amount of polyether from the polypropylene glycol and epoxy governs the phase separation mechanism or rate of the compositions and are thus governing the optimum amount of phenyl urea required.

The amount of accelerator required is also determined by the amount (b) present. For instance, larger amounts of (b) require larger amounts of accelerator.

Suitable amounts of dicyandiamide in the abovedescribed system would be in the range of 2.5% to 4.2% by weight of (a) and (b) depending on the amount of (a), (b) and any additional epoxies employed. Suitable commercially available dicyandiamides include DYHARD® 100SF dicyandiamides from SKW.

Additional epoxy resins may also be added to the composition to increase the strength of the cured product resulting therefrom. Additional epoxies include bisphenol A-based resins such as EPON®-828 epoxy from Shell or novolac resins such as DEN®-439 epoxy from Dow. When used, the amounts of additional epoxy can be varied up to 40% depending upon the desired properties. The preferable amount of bisphenol A epoxy resin is 15% by weight of the total amount of (a) and (b).

Other additives include conventional ingredients for adhesives, sealants, coatings and the like. Such additives include calcium silicate, fumed silica, phenolic resin, glycidyl trimethyl silane, zinc phosphate, calcium carbonate, Schiff base, calcium oxide, wollastonite and other conventional fillers for epoxy adhesives.

To prepare the epoxy composition of this invention, components (a)-(c), as well as any additional components, are formulated using simple mixing techniques. When the composition is to be used for its intended purpose, it is simply applied, heated and cured. The composition can be applied and adhered to substrates such as plastic or metals including cold rolled or galvanized steel. When used on metal surfaces of automobile parts, the composition can be applied as a paste adhesive or as a hot melt adhesive.

The composition comprising the above-described components is curable in the range of 120°-200° C. and upon being cured is a suitable adhesive, coating or sealant.

As mentioned above, when compositions according to this invention are cured at a temperature in the range of 120°-200° C., the cured product has two sufficiently distinct glass transition temperatures. By "sufficiently distinct", it has generally been found that the two temperatures differ by about 40° C or more. Further, while the positions of the peaks depend on resin composition and catalyst amounts, it is generally expected that the two temperatures should fall into two ranges, with the lower temperatures being in the range of about −5° to about 50° C. and the higher temperature being in the range 90° C. o 150° C. These ranges would be expected when determining the transition temperatures with a DMTA analyzer over the range of temperatures from −50° C. to 200° C. at a scan rate of 2°/minute.

As evidenced by the two sufficiently distinct glass transition temperatures, it is also believed that the cured product obtained from the composition according to this invention possesses a phase separated microstructure. Without being held to a particular theory, it is believed that the phase separation occurs during heating and curing of the epoxy composition. It is believed that during heating and curing the following occurs:

(1) chain extension products resulting from the reaction of catalyst system (c) and the reaction product of the epoxy and amine oligomer, thereby creating "domains" of linear products;

(2) homopolymerization of epoxy groups as affected by catalyst system (c);

(3) precipitation of the homopolymerized epoxy products to form a second "domain" or phase, thus creating phase separation;

(4) gelling of the composition; and (5) curing.

It is thus believed that the sufficiently distinct transition temperatures occur because of the presence of catalyst system (c) and the extent that it catalyzes the production of the homopolymerized epoxy indicated in (2) above.

When (c) is not used the resulting cured product exhibits only one $T_g$.

Figure 4:
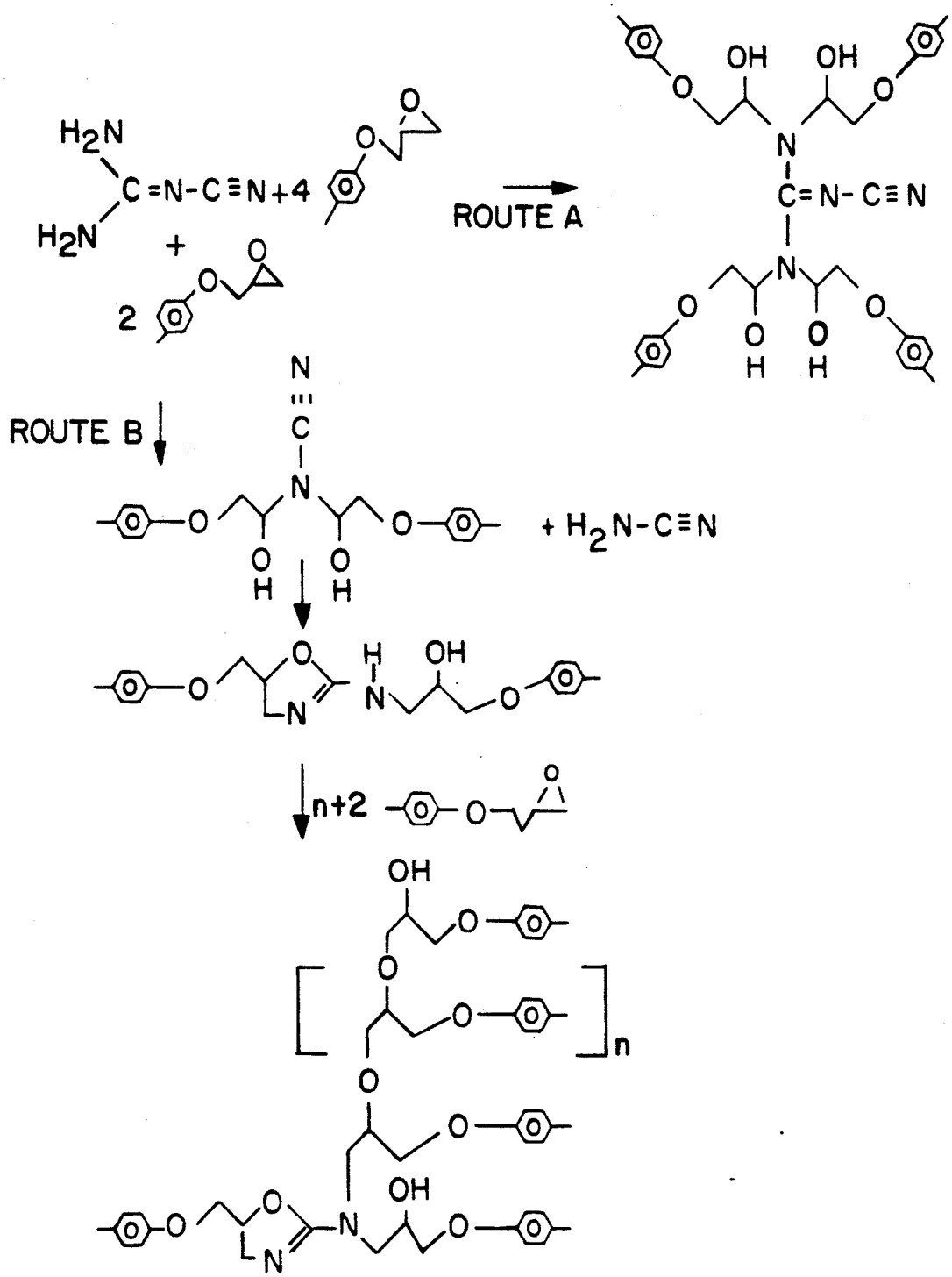
FIG. 4 is a diagram illustrating the theoretical reaction routes of an epoxy and dicyandiamide. Route A illustrates the uncatalyzed reaction mechanism, while Route B illustrates the catalyzed mechanism that leads to homopolymerization.

For instance, when (c) is not used, it is believed that cyclic adducts in (2) will not occur and that most of the reaction being carried out is that described in (I). That reaction, which is illustrated as reaction route A in FIG. 4, would continue until (4)-(5) occur. Because of the lack of sufficient amounts of homopolymerized material, most of the material's thermal mechanical properties, e.g. glass transition temperature, coincide with those of a homogeneous mixture of crosslinked epoxy and polypropylene glycol. A dynamical thermal mechanical analysis (DMTA) graph indicating the glass transition temperature of an epoxy cured without catalyst system (c) is illustrated in FIG. 1. The components of the epoxy composition illustrated in FIG. 1 are those described in Example 2.

Figure 2:
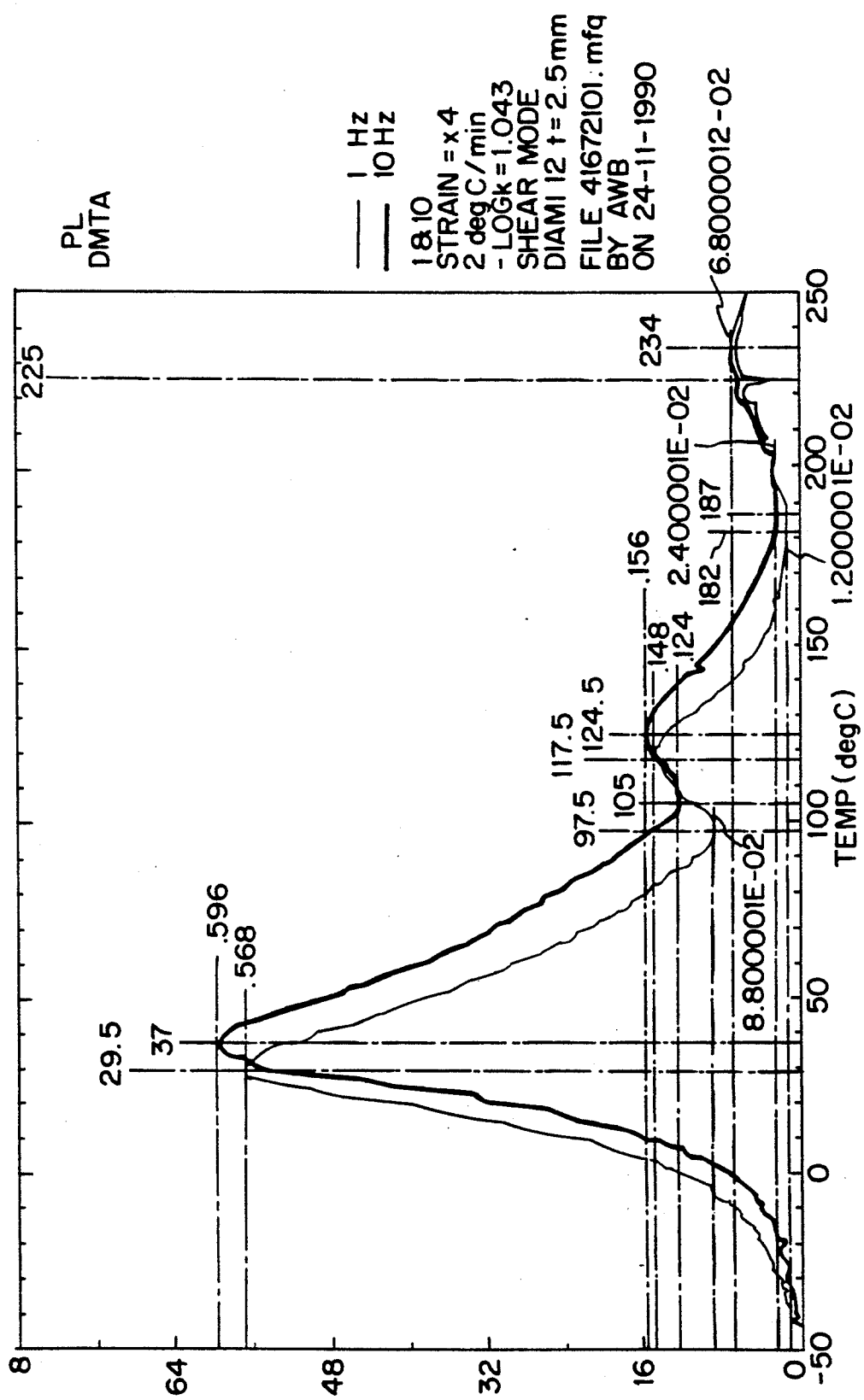
FIG. 2 is a DMTA measurement indicating two sufficiently distinct glass transition temperatures for the epoxy composition of the invention.
Figure 3:
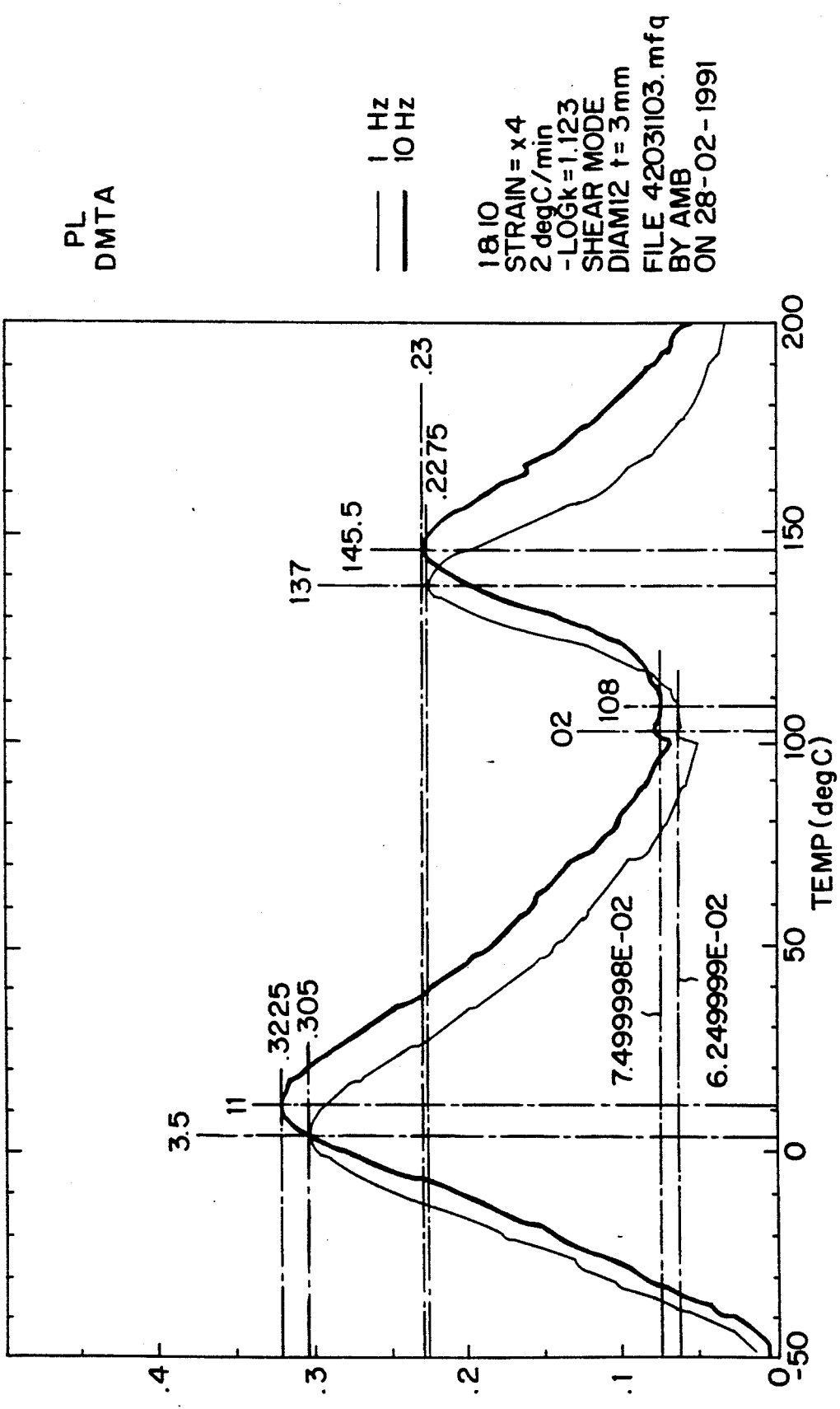
FIG. 3 is a DMTA measurement indicating two sufficiently distinct glass transition temperatures for another embodiment of the invention.

On the other hand, when catalyst system (c), e.g. phenylurea plus dicyandiamide, is present in the epoxy composition, DMTA graphs therefor shows two sufficiently distinct transition temperatures. See FIGS. 2 and 3. The compositions tested are from Examples 9 and 12 respectively. See Table 1 for a tabulation of glass transition temperatures of Examples 2-11. As mentioned above, it is believed that the second glass transition temperature appears because of the homopolymerization product resulting from the cyclic adducts in (2). The reaction creating these cyclic adducts is illustrated as reaction route B in FIG. 4.

Infrared spectra appear to support the belief that substantial formation of cyclic adducts occurs when (c) is used. For instance, in the absence of catalyst, it is thought that products containing nitrile (C≡N) groups are produced as evidenced by their characteristic peak at about 2200 cm$^{-1}$. As discussed above, those products are the result of chain extending the dicyandiamide and epoxy/amine product and will continually be produced until the epoxy composition gels and cures. Because the linear products contain nitrile groups infrared spectra of those products exhibit a peak having an infrared wavenumber of about 2110–2220 cm$^{-1}$. On the other hand, the infrared spectrum of a composition cured with catalyst system (c) lacks any significant peak within that range of wavenumbers. Such spectrum would be expected from products produced during cyclization reactions because during the formation of the cyclic compounds, the nitrile group is consumed. See reaction route B of FIG. 4. Infrared spectra of the epoxy composition of this invention lack those peaks.

As indicated above, it is believed that the two phases in the cured composition lead to an adhesive which is effective over a relatively wide range of temperatures. For instance, as mentioned above, one phase contains the homopolymerized epoxy indicated in (2), e.g. bisphenol-A polyether epoxy. This epoxy phase has thermal mechanical properties sufficiently different than the products found in (1). The products in (1) are basically linear polypropylene-based and only contain small amounts of epoxy as a result of phase separation. It is thought that the good adhesion properties, e.g. peel strength, even at temperatures lower than room temperature are achieved through the combined thermal mechanical properties of those two phases. As illustrated in Example 12 and Table 3, the composition illustrating a "filled" adhesive, i.e. adhesive containing conventional additives, has 180° peel strengths greater than 14.0 N/mm at −40° C. depending on the amounts of various components. Further, adhesion properties are exhibited at temperatures as low as −40° C. Table 3 has a complete tabulation of the properties for the compositions illustrated in Example 12.

While the invention has been described with preferred embodiments, it is to be understood that variations and modifications may be resorted to as will be apparent to those skilled in the art. Such variations and modifications are to be considered within the purview and the scope of the claims appended hereto.

Example 1

Preparation of Epoxy and Amine Oligomer Product 400g of EPON ® 828 epoxy from Shell and 300g of JEFFAMINE ®T-3000 amine oligomer from Texaco were mixed and reacted at 80° C. for about 12 hours. The resulting reaction product in the following examples is referred to as Component A.

400g of EPON ® 828 epoxy and 600g of JEFFAMINE ® D-4000 amine oligomer were mixed and reacted under the same conditions used to prepare Component A. This reaction product is referred to in the following examples as Component B.

EXAMPLES 2–11

Epoxy Composition Formulations

The formulations in Examples 2–11 are indicated in Table 1 and were prepared from Components A and B, EPON ® 872 epoxy from Shell Co., dicyandiamide ("DICY") and FIGURE ® phenyl dimethyl urea ("PDU") accelerator from Omicron Chemical Co. The amount of each component is in grams. These formulations were then cured at 180° C. for 30 minutes and measured for glass transition temperatures (Tg).

The transition temperatures were generated on a Dynamic Mechanical Thermal Analyzer (DMTA) manufactured by Polymer Laboratories Ltd. The procedures used to prepare the transition temperature curves were those provided with the analyzer. The results of the DMTA tests are tabulated in Table 1.

TABLE 1

| Component (g) | Examples |  |  |  |  |  |  |  |  |  |
|---|---|---|---|---|---|---|---|---|---|---|
|  | 2 | 3 | 4 | 5 | 6 | 7 | 8 | 9 | 10 | 11 |
| Component A | 8.0 | 8.0 | 8.0 | 8.0 | 8.0 | 8.0 | 8.0 | 8.0 | 8.0 | 8.0 |
| Component B | 42.0 | 42.0 | 42.0 | 42.0 | 42.0 | 42.0 | 42.0 | 42.0 | 42.0 | 42.0 |
| EPON-872 | 50.0 | 50.0 | 50.0 | 50.0 | 50.0 | 50.0 | 50.0 | 50.0 | 50.0 | 50.0 |
| DICY | 4.32 | 4.32 | 4.32 | 3.24 | 3.24 | 3.24 | 3.24 | 3.24 | 2.59 | 2.59 |
| PDU | — | 0.1 | 1.04 | — | 0.11 | 0.30 | 0.97 | 3.1 | 0.31 | 3.1 |
| Tg* | 68° C. | 64° C. | 53° C.,125° C. | 58° C. | 65° C. | 63° C.,110° C. | 57° C.,122° C. | 37° C.,124° C. | 62° C.,126° C. | 33° C.,115° C. |

*was measured on the Polymer Laboratories DMTA at 10 hertz (Hz).

TABLE 2

| Filled Adhesive Formulation | |
|---|---|
| Component | Amount (g) |
| Component B | 340 |
| Epon-872 epoxy | 190 |
| Epon-828 epoxy | 50 |
| Zinc Phosphate* | 150 |
| Nyad-400* | 50 |
| TS-720* | 50 |
| Calcium Oxide | 36 |
| Dicyandiamide | 18 |
| Ficure ® accelerator | 6 |
| Blue Color | 1 |
| Tg** | 11°, 146° C. |

*The zinc phosphate was obtained as Delaphos ® from ISC Alloys. Nyad-400 is wollastonite from NYCO. TS-720 is hydrophobic fumed silica from Cabot.
**See FIG. 3 for DMTA data illustrating the glass transition temperatures. Tg was measured under the parameters used for the compositions illustrated by Examples 2–11.

Adhesion Tests

Table 3 contains adhesion strength test results for the composition illustrated in Example 12 (See Table 2) and for a composition described in the prior art. See U.S. Pat. No. 4,962,138. The composition illustrated by Example 12 contains the components listed in Table 2 and were mixed using the conventional formulation techniques used for Examples 2–11.

A modified version of ASTM-1876 test for peel resistance was used to measure the peel strength of the above-mentioned compositions. This adhesion test is a 180° peel strength test in which an adhesive bond having an initial thickness of 0.5 mm was created between two substrates and then stretched at a rate of 24.5 mm/min. The substrates were either cold rolled steel (CRS) or galvanized steel obtained from ATC in Detroit as 2.54 cm × 10.16 cm × 0.08 cm coupons. About 1.77 cm of one end of the coupon was bent 90°. After the adhesive is cured between the two coupons the resulting part looks like a "T". The thickness of the bond is controlled by three spacer wires place perpendicular to the axis of the bond, one in the middle and one at each end. In this test the spacer wire was 0.2 mm. The test sample was held together with spring loaded paper clips and cured in an oven at the required temperature for the required time.

The 1.77 cm legs of the T were then clamped in a tension testing machine and pulled at the fastest cross head speed to test for bond failure.

The modes of failure in a peel test can be varied and can be caused by three types of failure. One mode of failure is "brittle failure" which occurs when the bond fails and then at some point shortly thereafter the bond exhibits little or no resistance to the force applied by the testing machine. These points occurred for the prior art adhesive at about 10 mm, 50 mm and about 110 mm displacement of the machine's crosshead. See FIG. 5. Brittle failure can be caused by a type of failure in the adhesive bond itself, i.e. "cohesive failure", or by "unzipping", i.e. the bond fails at the adhesive/substrate interface and the substrates show little or no bending at displacement. The other mode of failure is "toughened failure" in which the bond fails, but still shows resistance to force. For instance in cohesive or "adhesive" failure (which is similar to unzipping except that the substrate bends during failure), failure of the bond occurs but the bond still shows resistance to force as the crosshead displacement increases. See FIG. 6. As shown in FIG. 6, a bond prepared from the invention does not fail at 40° C., i.e. show a crack, until about 5 mm of crosshead displacement at a force of about 10 Newtons per millimeter (N/mm). However, it still maintains resistance to a force of about 14.0 N/mm at displacements in the range of 5-125 mm.

The tabulations appearing below in Table 3 is the minimum force value to which the bond exhibits resistance to force over a range of crosshead displacements.

The table below also contains shear strength test results conducted for Example 12 and the prior art composition. The tests were run according to ASTM D1002 which is a conventional shear test technique. In some instances, the substrate began to elongate before the adhesive bonds broke.

The peel strength and sheer strength tests are just one of several tests used to demonstrate how an adhesive might behave in an automobile as it goes through various stages of stress.

TABLE 3

Comparison of Epoxy Adhesives

| | Prior Art Epoxy* | Adhesive According to Example 12 |
|---|---|---|
| Peel Strength (N/mm) | | |
| Test Temperature | | |
| RT** | 9.1 coh*** | 8.5 coh |
| −40° C. | 0.54 unzip*** | 14.0 coh |
| +80° C. | 7.3 coh | 3.6 coh |
| Shear Strength (mPA) | | |
| RT | 20.7 str sub*** | 12.4 coh |
| −40° C. | 20.7 str sub | 18.3 str sub |
| +80° C. | 13.1 coh | 8.3 coh |

TABLE 3-continued

Comparison of Epoxy Adhesives

| | Prior Art Epoxy* | Adhesive According to Example 12 |
|---|---|---|
| Glass Transition Temp. | 89° C. | 11° C.,145° C. |

*improved toughened epoxy adhesive prepared according to the methods disclosed in U. S. Pat. No. 4,962,138
**room temperature of about 25° C.
***coh - cohesive failure in the adhesive; unzip - adhesive fails rapidly at the substrate/adhesive interface with minimal bending of the substrate, see FIG. 5; str sub - substrate elongated before epoxy adhesive failed cohesively Examples 13-15

The formulations for Examples 13-15 are illustrated in Table 4 and were prepared from Component B, EPON ® 828 and/or 872 epoxies from Shell Co. and 2,4-ethylmethyl imidazole ("2,4-EMI"). The amount of each component is in grams. These formulations were then cured at 180° C. for thirty minutes and measured for glass transition temperatures in the same manner described for Examples 2-11.

EXAMPLE 16

Example 16 is based on results obtained from Examples 14 and 15. The components for Example 16 include component B, EPON ® 872 epoxy adduct of dimer acid, additional epoxy (EPON ® 828 epoxy) and imidazole curing agent. These components are formulated in the same manner as described in Examples 14 and 15. As evident from the expected glass transition temperatures, the addition of EPON 828 epoxy to the formulation in Example 14 is needed to obtain two distinct transition temperatures. For instance, without being held to a specific theory, it is believed that when EPON 872 epoxy was used alone, a series of different phases were created upon curing. See Example 14. These series of phases produced a composition having a range of mechanical properties thus causing a broad peak in DMTA analysis. This peak was so broad it overlaps with the additional peak present, thus causing that additional peak to appear as a shoulder peak. On the other hand, when EPON 828 epoxy was used alone, a cured composition having two sufficiently distinct glass transition temperatures resulted. See Example 15. Accordingly, it is believed that the addition of EPON 828 epoxy to EPON 872 epoxy should provide a sufficiently distinct phase in the cured composition, thus providing a more distinct second glass transition temperature and the desired adhesive properties, e.g. strength and adhesion.

TABLE 4

| Example | 13 | 14 | 15 | 16 |
|---|---|---|---|---|
| Component B | 9.75 | 9.75 | 10 | 10 |
| EPON-828 | — | — | 5 | 5 |
| EPON-872 | 5.25 | 5.25 | — | 5 |
| 2,4-EMI | 0.1 | 0.3 | 1.2 | 1.2 |
| tanδ @10 Hz | 48° C. | −21° C.*, 61° C.* | 30° C., 122° C. | 10° C., 130° C.ᵉ |

*the −21° C. peak appeared as a shoulder and the 60° C. peak was broad
ᵉThese figures are estimates based on tan § obtained in Examples 14 and 15; Actual results may vary. It is expected that these two tan §, i.e. glass transition temperatures, will be sufficiently distinct.

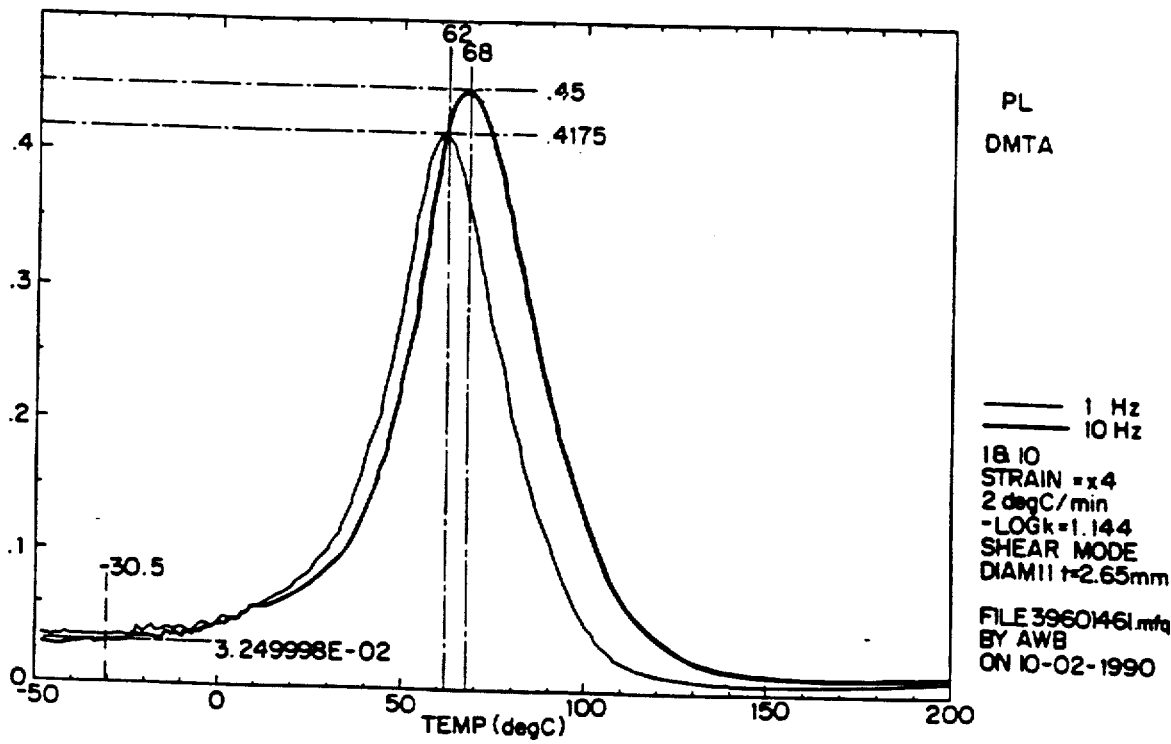

I claim:
1. An epoxy composition comprising
   (a) at least one reaction product of epoxy and amine-capped oligomer;
   (b) epoxy adduct of dimer acid,

(c) a catalyst system which is present in an amount sufficient to cause homopolymerization of substantially all reactive epoxy present in the composition; wherein the epoxy composition obtained having two glass transition temperatures which differ by at least about 40° C. when said composition is cured.

2. An epoxy composition according to claim 1 wherein the epoxy in (a) is a bisphenol A-based epoxy.

3. An epoxy composition according to claim 1 wherein the amine-capped oligomer in (a) is an amine-capped polyether.

4. An epoxy composition according to claim 3 wherein the polyether is polypropylene glycol.

5. An epoxy composition according to claim 1 wherein (a) comprises a mixture of different reaction products of epoxy and amine-capped oligomers.

6. An epoxy composition according to claim 5 wherein said reaction product (a) comprises a mixture of:

(1) the reaction product of
(i) an epoxy having the structure of

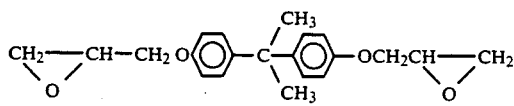

and (ii) an amine-capped oligomer comprising

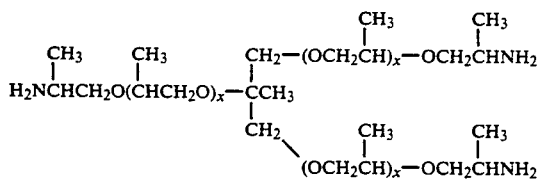

wherein x is an integer such that the weight average molecular weight of (ii) is about 3000; and (2) the reaction product of the epoxy in (1) (i) above and an amine-capped oligomer of

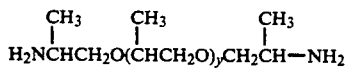

wherein y is an integer such that the weight average molecular weight of said amine-capped oligomer is about 4000.

7. An epoxy composition according to claim 1 wherein (b) is a bisphenol A-based epoxy adduct of dimer acid.

8. An epoxy composition according to claim 1 wherein (b) is an epoxy having the formula y-x-y wherein X is

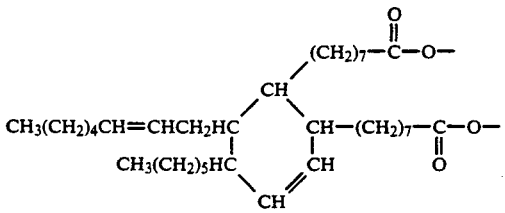

and Y is

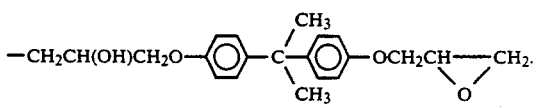

9. An epoxy composition according to claim 1 wherein (c) comprises phenyl urea and dicyandiamide.

10. An epoxy composition according to claim 1 wherein (c) comprises an imidazole.

11. An epoxy composition according to claim 9 wherein the phenyl urea is present in an amount in the range of about 0.3 to about 3% by weight of (a) and (b).

12. An epoxy composition according to claim 1 wherein when said composition is cured at a temperature int he range of about 120° C.-200° C., the cured composition has two sufficiently distinct glass transition temperatures which are separated by at least 40° C.

13. An epoxy composition according to claim 1 wherein when said composition is cured at a temperature in the range of about 120° to 200° C., the cured composition has one glass transition temperature in the range of about −5° C. to 50° C. and a second glass transition temperature in the range of about 90° C. to 150° C. as measured by a dynamical mechanical thermal analyzer at a frequency in the range of 1 to 10 hertz.

14. A cured product resulting from an epoxy composition of the group of compositions recited in any one of claims 1-13.

15. A cured product according to claim 14 wherein said product is an adhesive.

* * * * *

UNITED STATES PATENT AND TRADEMARK OFFICE
CERTIFICATE OF CORRECTION

PATENT NO. : 5,218,063

DATED : June 8, 1993

INVENTOR(S) : Michael E. Kimball (Deceased)

It is certified that error appears in the above-identified patent and that said Letters Patent is hereby corrected as shown below:

Cover sheet, Item [75], please change:

Edward A. Kimball, deceased, late of Westbrook, Me.; by

Michael E. Kimball, Legal Representative.

Signed and Sealed this

Thirty-first Day of August, 1993

*Attest:*

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,218,063
DATED : June 8, 1993
INVENTOR(S) : Michael E. Kimball, et al.

It is certified that error appears in the above-identified patent and that said Letters Patent is hereby corrected as shown below:

The title page should be deleted to appear as per attached title page.

This certificate supersedes Certificate of Correction issued August 31, 1993.

Signed and Sealed this

Seventh Day of June, 1994

Attest:

BRUCE LEHMAN

Attesting Officer

Commissioner of Patents and Trademarks

United States Patent [19]

Kimball, deceased

[11] Patent Number: 5,218,063
[45] Date of Patent: Jun. 8, 1993

[54] EPOXY ADHESIVES AND METHODS OF USING CURED COMPOSITIONS THEREFROM

[75] Inventor: Michael E. Kimball, deceased, late of Westbrook, Me.; by Edward A. Kimball, legal representative

[73] Assignee: W. R. Grace & Co.-Conn., New York, N.Y.

[21] Appl. No.: 721,738

[22] Filed: Jun. 26, 1991

[51] Int. Cl.⁵ ............................................. C08F 283/00
[52] U.S. Cl. .................................. 525/531; 525/532; 525/533; 525/931
[58] Field of Search .............. 525/531, 931, 532, 533

[56] References Cited

U.S. PATENT DOCUMENTS

| | | | |
|---|---|---|---|
| 4,121,015 | 10/1978 | McPherson | 428/418 |
| 4,159,976 | 7/1979 | Moran, Jr. | 525/113 |
| 4,423,170 | 12/1983 | Waddill | 528/407 |
| 4,485,229 | 11/1984 | Waddill et al. | 525/504 |
| 4,581,422 | 4/1986 | Speranza et al. | 525/504 |
| 4,866,108 | 9/1989 | Vachon et al. | 523/466 |
| 4,940,770 | 7/1990 | Speranza et al. | 528/111 |
| 5,071,914 | 12/1991 | Zimmel et al. | 525/117 |

OTHER PUBLICATIONS

"Kraton Rubber Modified Epoxy Blends", L. A. Pottick, 34th Int'l SAMPE Symposium May 8-11, 1989, pp. 2243-2254.

Journal of Applied Polymer Science, vol. 26, 1981, "Rubber-Modified Epoxies. II. Morphology and Mechanical Properties"—L. T. Manzione et al. pp. 907-919.

Journal of Applied Polymer Science, vol. 40, Nos. 1 & 2, Jul. 5 & 20, 1990—"Epoxy-Amine Oligomer Production"—T. R. Cuadrado et al. pp. 867-890.

Primary Examiner—John C. Bleutge
Assistant Examiner—Randy Gulakowski
Attorney, Agent, or Firm—Valerie E. Looper

[57] ABSTRACT

An epoxy composition suitable for adhesives, coatings and sealants is prepared from (a) at least one reaction product of an epoxy and amine-capped oligomer, (b) an epoxy adduct of dimer acid, (c) dicyandiamide and (d) a catalyst which yields a dimethyl amine radical upon being heated. When the epoxy composition is cured, it exhibits two glass transition temperatures and good adhesion properties at and below room temperature. The epoxy is particularly suitable for adhesives used in the manufacturing of automobiles.

15 Claims, 6 Drawing Sheets